United States Patent [19]

Mazanek et al.

[11] Patent Number: 4,739,094
[45] Date of Patent: Apr. 19, 1988

[54] ALKOXYLATED AMINOPOLYETHERS, A PROCESS FOR THEIR PREPARATION

[75] Inventors: Jan Mazanek, Cologne; Hanns P. Müller, Odenthal; Roland Nast, Dormagen; Wolfgang Oberkirch, Leverkusen; Franz-Moritz Richter, Dormagen; Walter Schäfer, Cologne, all of Fed. Rep. of Germany

[73] Assignee: Bayer Aktiengesellschaft, Leverkusen, Fed. Rep. of Germany

[21] Appl. No.: 807,388

[22] Filed: Dec. 10, 1985

[30] Foreign Application Priority Data

Dec. 21, 1984 [DE] Fed. Rep. of Germany ....... 3446921

[51] Int. Cl.$^4$ .......................... C10L 1/32; C08G 65/32
[52] U.S. Cl. ...................................... 558/158; 558/47; 528/76; 528/391
[58] Field of Search ..................... 528/76, 391; 558/47, 558/158

[56] References Cited

U.S. PATENT DOCUMENTS

| | | | |
|---|---|---|---|
| 3,155,728 | 11/1964 | Lesesne | 564/505 |
| 3,236,895 | 2/1966 | Lee et al. | 564/505 |
| 3,524,682 | 8/1970 | Booth | 406/195 |
| 3,654,370 | 4/1972 | Yeakey | 564/481 |
| 3,762,897 | 10/1973 | Johnson | 65/3.1 |
| 3,865,791 | 2/1975 | Brinkmann | 528/73 |
| 3,974,209 | 8/1976 | Mitchell | 558/158 |
| 4,104,035 | 8/1978 | Cole | 44/51 |
| 4,282,006 | 8/1981 | Funk | 44/51 |
| 4,283,542 | 8/1981 | O'Lenick, Jr. et al. | 558/158 |
| 4,302,212 | 11/1981 | Noboru | 44/51 |
| 4,304,572 | 12/1981 | Wiese et al. | 44/51 |
| 4,358,293 | 11/1982 | Mark | 44/51 |
| 4,465,858 | 8/1984 | Cuscurida et al. | 564/477 |

FOREIGN PATENT DOCUMENTS

| | | |
|---|---|---|
| 0634741 | 7/1962 | Belgium . |
| 0025998 | 4/1981 | European Pat. Off. . |
| 0041337 | 12/1981 | European Pat. Off. . |
| 0057576 | 8/1982 | European Pat. Off. . |
| 0057333 | 8/1982 | European Pat. Off. . |
| 1193671 | 5/1965 | Fed. Rep. of Germany . |
| 2546536 | 4/1977 | Fed. Rep. of Germany . |
| 2937224 | 4/1981 | Fed. Rep. of Germany . |
| 2948491 | 6/1981 | Fed. Rep. of Germany . |
| 1551605 | 12/1968 | France . |

OTHER PUBLICATIONS

H: Petroleum, J5-H, Week D36, D30, KAOS*.
Petroleum-p.5, J5-H, Week 83/35, DAII*.
Petroleum-p.2, J5-H, Week E42, NIOF*.

Primary Examiner—John Kight
Assistant Examiner—M. L. Moore
Attorney, Agent, or Firm—Sprung Horn Kramer & Woods

[57] ABSTRACT

New alkoxylated aminopolyethers of the formula

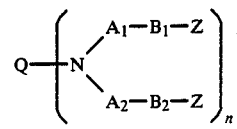

in which

Q denotes a polyalkylene oxide radical which has a valency corresponding to n, which has a structure derived from an aminopolyether by removal of the terminal amino groups and which has an average molecular weight of 82 to 30,000, $A_1$ and $A_2$ denote identical or different mono- or polyalkylene oxide radicals of the type $(RO)_y$, wherein each radical R represents an alkylene radical with 2 to 40 C atoms and y represents an integer from 1 to 200, $B_1$ and $B_2$ denote identical or different mono- or polyalkylene oxide radicals of the type $(R'O)_z$, wherein at least 50% of the R' radicals represent a $-CH_2-CH_2-$ group, the other R' radicals which may be present each represent an alkylene radical with 3 to 40 C atoms and z represents an integer from 1 to 300, Z denotes hydrogen,

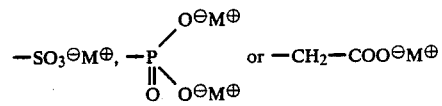

wherein $M^\oplus$ represents one equivalent of a metal ion or represents $NH_4^\oplus$ and n denotes an integer from 1 to 30, a process for their preparation and coal/water slurries containing them.

11 Claims, No Drawings

ALKOXYLATED AMINOPOLYETHERS, A PROCESS FOR THEIR PREPARATION

BACKGROUND OF THE INVENTION

The present invention relates to new alkoxylated aminopolyethers, a process for their preparation and coal/water slurries containing them.

Slurries of finely ground mineral coal in water are known, for example, from U.S. Pat. No. 4,358,293, U.S. Pat. No. 4,302,212, Japanese Patent Application No. 58-125,787 and Japanese Patent Application No. 57-145,190. On the one hand, they can be transported inexpensively through pipelines, and on the other hand they can be burned directly in existing combustion plants. Coupling of transportation with subsequent combustion is particularly advantageous. The coal/water slurries can also be prepared immediately before combustion and then burned. Problem-free handling from the safety point of view is an advantage here.

In the preparation of coal/water slurries, it is found that, without the addition of auxiliaries, the viscosity of the slurries increases over-proportionally as the solids content increases and the slurry solidifies when it is still far below a coal concentration which allows use of the slurries as fuel.

Various measures can be taken to improve the flow properties of coal/water slurries. According to U.S. Pat. No. 3,762,897 and U.S. Pat. No. 4,282,006, a particular distribution of the particle sizes of the coal employed leads to an improvement in the flow properties, while according to U.S. Pat. No. 4,282,006, anionic surface-active compounds are additionally used. The use of anionic or cationic surfactants, high molecular weight substances and polyelectrolytes in the preparation of aqueous coal slurries is furthermore known (see U.S. Pat. No. 4,104,035, U.S. Pat. No. 4,304,572, U.S. Pat. No. 3,524,682, EP-OS (European Published Specification) No. 41,337, JP-OS (Japanese Published Specification) No. 56-067,396 and JP-OS (Japanese Published Specification) No. 56-088,495). Non-ionic alkylene oxide copolymers ethoxylated with at least 100 ethylene oxide units are described as surface-active substances for coal/water slurries in U.S. Pat. No. 4,358,293, alkylphenols, propylene glycol or alkylenediamines being used as starter molecules. JP-OS (Japanese Published Specification) No. 58-125,787 describes branched, nonionic and nitrogen-containing alkylenepolyethers, and U.S. Pat. No. 4,302,212 and JP-OS (Japanese Published Specification) No. 57-145,190 describe polyalkylene oxides built up from starter molecules containing hydroxyl groups.

However, the known surface-active substances are not satisfactory for commercial use, since the aqueous coal slurries thus prepared have such high viscosities, especially at higher solids contents, such that they are difficult to handle in industry as mixtures with good flow properties.

SUMMARY OF THE INVENTION

Alkoxylated aminopolyethers of the formula (I)

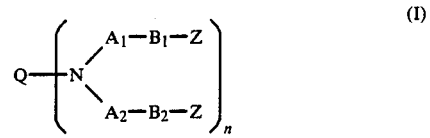

in which
Q denotes a polyalkylene oxide radical which has a valency corresponding to n, which has a structure derived from an aminopolyether by removal of the terminal amino groups and which has an average molecular weight of 82 to 30,000,
$A_1$ and $A_2$ denote identical or different mono- or polyalkylene oxide radicals of the type $(RO)_y$,
wherein
each radical R represents an alkylene radical with 2 to 40 C atoms and
y represents an integer from 1 to 200,
$B_1$ and $B_2$ denote identical or different mono- or polyalkylene oxide radicals of the type $(R'O)_z$,
wherein
at least 50% of the R' radicals represent a $-CH_2-CH_2-$ group,
the other R' radicals which may be present each represent an alkylene radical with 3 to 40 C atoms and
z represents an integer from 1 to 300,
Z denotes hydrogen,

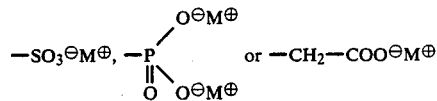

wherein
$M^\oplus$ represents one equivalent of a metal ion or represents $NH_4^\oplus$ and
n denotes an integer from 1 to 30,
have now been found.

Preferred alkoxylated aminopolyethers of the formula (I) are those in which, independently of one another,
Q denotes the radical of a polypropylene oxide, polyethylene/polypropylene oxide, polytetramethylene oxide or polytetramethylene oxide/polydecene oxide started from ethylene glycol, propylene glycol, trimethylolpropane, glycerol, pentaerythritol, ethylenediamine or hexamethylenediamine and in each case with an average molecular weight of 82 to 7,000,
$A_1$ and $A_2$ denote identical or different mono- or polyalkylene oxide radicals of the type $(RO)_y$,
wherein
each radical R represents an alkylene radical with 2 to 12 C atoms and
y represents an integer from 1 to 80,
$B_1$ and $B_2$ denote identical or different polyalkylene oxide radicals of the type $(R'O)_z$,
wherein
60 to 100% of the R' radicals represent a $-CH_2-CH_2-$ group,
the other R' radicals which may be present each represent an alkylene radical with 3 to 12 C atoms and
z represents an integer from 50 to 200,
z denotes hydrogen,

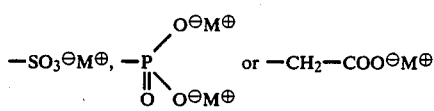

wherein
- M⊕ represents one equivalent of a metal ion or represents NH$_4$⊕, which forms soluble sulphonium, phosphonium or carboxyl salts, and
- n denotes an integer from 1 to 8.

Particularly preferred alkoxylated aminopolyethers of the formula (I) are those in which
- Q, A$_1$, A$_2$, B$_1$, B$_2$, Z and n each have the meaning given as preferred and
in which
- M⊕ represents an alkali metal ion, for example a sodium or potassium ion, or one equivalent of an alkaline earth metal ion, for example one equivalent of a magnesium or calcium ion, or represents NH$_4$⊕.

The alkoxylated aminopolyethers of the formula (I) according to the invention can have a molecular weight of, for example, 10,000 to 150,000. The molecular weight is preferably in the range from 15,000 to 50,000.

The alkoxylated aminopolyethers of the formula (I) according to the invention can be prepared, for example, by addition of a C$_2$- to C$_{12}$-alkylene oxide onto an amino-polyalkylene ether in a manner such that initially in each case at least two alkylene oxide units react with an amino group.

After the addition and polymerization of the C$_2$- to C$_{12}$-alkylene oxides, further reaction with ethylene oxide or a mixture of the C$_2$- to C$_{40}$-epoxides can take place. If appropriate, the polyalkylene-polyaminoalkylene ethers thus prepared can also be reacted with carboxylic acid anhydrides, amidosulphonic acids and urea, acid chlorides of sulphur or of phosphorus or chloroacetic acid esters, and the products can be converted into the ionic compounds (where Z≠H) by subsequent neutralization or hydrolysis.

Suitable reaction conditions for the reaction of C$_2$- to C$_{12}$-alkylene oxides with the amino-polyalkylene ether are, for example, atmospheric pressure or increased pressure, temperatures between 50° and 150° C. and the presence of a base as a catalyst, for example the presence of alkali metal hydroxides or alcoholates. The degree of polymerization or the size of this block is determined by the molar ratio of C$_2$- to C$_{12}$-alkylene oxide to amino-polyalkylene ether, which is preferably in the range from 4:1 to 1,600:1. After this addition of the C$_2$- to C$_{12}$-alkylene oxide onto the amino-polyalkylene ethers, the addition of ethylene oxide can take place, 50 to 200 ethylene oxide units per chain preferably being introduced one after the other. Mixtures of C$_2$- to C$_{40}$-epoxides can also be used for this purpose.

The amino-polyalkylene ethers to be employed for the preparation of the compounds according to the invention can be polyalkylene ethers with amino end groups and an average molecular weight of 82 to 30,000. These can be obtained, for example, by amination of polyalkylene glycol ethers with ammonia in the presence of Raney nickel and hydrogen (see Belgian Patent Specification No. 634,741), by reaction of the corresponding polyol with ammonia and hydrogen in the presence of a nickel/copper/chromium catalyst (see U.S. Pat. No. 3,654,370) or by hydrogenation of cyanoethylated polyoxypropylene ethers (see German Patent Specification No. 1,193,671). The molar content of amino groups in the end groups of these polyethers to be employed can be, for example, 10 to 100%. This content is preferably 50 to 100%.

Other methods for the preparation of polyoxyalkylene(polyether)-amines are described in U.S. Pat. No. 3,155,728, U.S. Pat. No. 3,236,895 and French Patent Specification No. 1,551,605. According to DE-OS (German Published Specification) No. 2,546,536 or U.S. Pat. No. 3,865,791, polyethers containing amino groups can be obtained by reacting NCO prepolymers based on polyhydroxypolyethers with enamines, aldimines or ketimines containing hydroxyl groups and subsequent hydrolysis. According to DE-OS (German Published Specification) No. 2,948,491, aminopolyethers can be obtained by hydrolysis of compounds containing terminal isocyanate groups. Preferably, in this process, polyethers containing two hydroxyl groups are reacted with polyisocyanates to give NCO prepolymers, and the isocyanate groups are converted into amino groups by hydrolysis in a second step.

The alkoxylated aminopolyethers of the formula (I) according to the invention can be kept ready for further use, for example as an additive for coal/water slurries, in solid form, for example in the form of flakes, tablets or granules. Since the alkoxylated aminopolyethers of the formula (I) according to the invention are water-soluble, it is frequently advantageous to keep them ready for further use in the form of aqueous solutions. Such solutions can have, for example, a concentration of 5 to 60% by weight, preferably 20 to 50% by weight, in each case based on the solution.

Such aqueous solutions can additionally contain organic water-miscible solvents. This is in general advantageous if a reduction in the viscosity is desired to facilitate use, especially in the case of relatively concentrated solutions. Examples of solvents which are suitable for this purpose are aliphatic alcohols with 1 to 6 C atoms, such as methanol, ethanol, propanol, isopropanol, butanol, isobutanol, pentanol, isopentanol, hexanol and/or isohexanol. Such organic water-miscible solvents can be present, for example, in amounts of 5 to 40% by weight, based on the solution of the compounds of the formula (I). This amount is preferably 10 to 25% by weight.

The present invention furthermore relates to coal/water slurries, which are characterised in that they contain alkoxylated aminopolyethers of the formula (I)

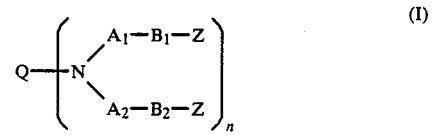

(I)

in which
- Q denotes a polyalkylene oxide radical which has a valency corresponding to n, which has a structure derived from an aminopolyether by removal of the terminal amino groups and which has an average molecular weight of 82 to 30,000,
- A$_1$ and A$_2$ denote identical or different mono- or polyalkylene oxide radicals of the type (RO)$_y$, wherein
  - each radical R represents an alkylene radical with 2 to 40 C atoms and
  - y represents an integer from 1 to 200, $B_1$ and $B_2$ denotes identical or different mono- or polyalkylene oxide radicals of the type $(R'O)_z$, wherein at least 50% of the $R'$ radicals represent a —CH$_2$—CH$_2$— group, the other $R'$ radicals which may be present each represent an alkylene radical with 3 to 40 C atoms and z represents an integer from 1 to 300, Z denotes hydrogen,

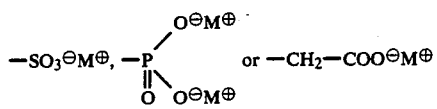

wherein $M^\oplus$ represents one equivalent of a metal ion or represents $NH_4^\oplus$ and n denotes an integer from 1 to 30.

The coal/water slurries according to the invention preferably contain those alkoxylated aminopolyethers of the formula (I) in which, independently or one another, Q denotes the radical of a polypropylene oxide, polyethylene/polypropylene oxide, polytetramethylene oxide or polytetramethylene oxide/polydecene oxide started from ethylene glycol, propylene glycol, trimethylolpropane, glycerol, pentaerythritol, ethylenediamine or hexamethylenediamine and in each case with an average molecular weight of 82 to 7,000, $A_1$ and $A_2$ denote identical or different mono- or polyalkylene oxide radicals of the type $(RO)_y$, wherein each radical R represents an alkylene radical with 2 to 12 C atoms and y represents an integer from 1 to 80, $B_1$ and $B_2$ denote identical or different polyalkylene oxide radicals of the type $(R'O)_z$, wherein 60 to 100% of the $R'$ radicals represent a —CH$_2$—CH$_2$— group, the other $R'$ radicals which may be present each represent an alkylene radical with 3 to 12 C atoms and z represents an integer from 50 to 200, Z denotes hydrogen,

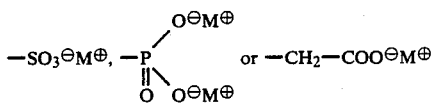

wherein $M^\oplus$ represents one equivalent of a metal ion or represents $NH_4^\oplus$, which forms soluble sulphonium, phosphonium or carboxyl salts, and n denotes an integer from 1 to 8.

The coal/water slurries according to the invention particularly preferably contain those alkoxylated aminopolyethers of the formula (I) in which Q, $A_1$, $A_2$, $B_1$, $B_2$, Z and n each have the meaning given as preferred and in which $M^\oplus$ represents an alkali metal ion, one equivalent of an alkaline earth metal ion or represents $NH_4^\oplus$.

The coal/water slurries according to the invention can contain alkoxylated aminopolyethers of the formula (I), for example, in an amount of 0.01 to 5% by weight. This amount is preferably 0.1 to 2% by weight.

Coal which is suitable for the coal/water slurries according to the invention comprises the most diverse types of coal, for example all types of mineral and synthetic coals. Coals which may be mentioned in particular are: anthracite, coke, lignite, moor coal, wood charcoal and carbon in the graphite modification. However, mineral coal is of special interest.

The slurries according to the invention can contain the coal in various particle sizes. They preferably contain finely ground coal with an average particle size of less than 300 μm. They particularly preferably contain coal consisting to the extent of 75 to 100% by weight of particles smaller than 100 μm.

The slurries according to the invention can contain coal, for example, in an amount of 30 to 85% by weight. They preferably contain 55 to 80% by weight of coal.

In addition to water, coal and alkoxylated aminopolyethers of the formula (I), the slurries according to the invention can, if appropriate, contain further constituents, for example organic water-miscible solvents, anti-foaming agents, stabilisers against sedimentation, biocides, surface-active substances other than those of the formula (I) and/or fuels other than coal.

The organic water-miscible solvents can be, according to quality and quantity, those which have been described above as additives to aqueous solutions for alkoxylated aminopolyethers of the formula (I).

Examples of possible anti-foaming agents are commercially available products, such as the various Surfynol ® types from Air Products and Chemicals, Allentown PA.

The coal slurry can contain these anti-foaming agents in amounts of 0 to 0.5%, preferably 0.02 to 0.1%.

Examples of possible stabilizers against sedimentation are cellulose derivatives, xanthanes, guar rubber and the like. The coal slurries can contain these stabilizers in amounts of 0 to 1%, preferably 0.01 to 0.2%.

Examples of other possible surface-active substances are ionic and/or non-ionic wetting agents or other ionic and/or non-ionic dispersing agents. The coal slurries can contain them, for example, in amounts of 0 to 1%, preferably 0.02 to 0.5%.

Examples of other possible fuels are liquid fuels, such as heating oil, naphtha, crude oil, methanol or ethanol. The coal slurries can contain them, for example, in amounts of 0 to 60% by weight, preferably 1 to 30% by weight.

The coal/water slurries according to the invention can be prepared by various processes.

Thus, it is possible first to prepare a solution of the alkoxylated aminopolyethers according to the invention in water or to bring an existing aqueous solution thereof to the desired concentration and then to add the powdered coal, with stirring. It is also possible first to mix an aqueous solution of the compounds according to the invention, in suitable concentration, with coarse-particled coal and then to grind this mixture until the coal has the desired particle size.

Other additives can be introduced into the mixture before or after addition of the coal. Other additives, in particular liquid fuels, can also be introduced together with the coal.

In comparison with the known coal/water slurries, the coal/water slurries according to the invention have improved flow properties. This means that the slurries according to the invention contain more coal for the same viscosity, or have a lower viscosity for the same coal content, than the known coal/water slurries.

According to their rheological properties, coal/water slurries are usually non-Newton plastic liquids with structural viscosity properties and a flow limit. Their viscosity depends on the rate of shear (apparent viscosity). The viscosity of the coal/water slurries according to the invention can be, for example, in the range from 3 to 10,000 mPa.s. The viscosity is preferably in the range from 5 to 3,000 mPa.s, in each case at a shear rate of $100 \text{ s}^{-1}$.

In addition to the flow properties, the storage properties of the coal/water slurries according to the invention are particularly advantageous. Thus, the coal/water slurries according to the invention can easily be brought into motion again, even after storage, and cementing during transient settling of the coal can be prevented. This is particularly advantageous both during transportation and during combustion or other further processing of the coal/water slurries.

The coal/water slurries according to the invention can be fed directly, that is say without further preparation, to combustion, for example in a heating and power station.

EXAMPLES

The following examples illustrate the invention without limiting it.

EXAMPLES

A.

Preparation examples for alkoxylated aminopolyethers of the formula (I)

EXAMPLE 1

5 g of water were added to 8.4 g (0.08 mole) of 2,2-diamino-diethyl ether, and 17.6 g (0.3 mole) of propylene oxide were added under nitrogen (pressure of 1.5 bar) at 100° C. After 5 hours, 16 g of 45% strength aqueous potassium hydroxide solution were added and water was then distilled off at 100° C. in vacuo. 1,210 g (20.8 moles) of propylene oxide were then added in the course of 11 hours and 4,462 g (101.4 moles) of ethylene oxide were added in the course of 14 hours, in each case at 120° to 130° C. The reaction product was then neutralized with 8.55 g (0.14 mole) of 99.8% strength acetic acid. 5,600 g of a waxy polyether of melting point 57° to 60° C. were obtained.

OH number: 6.
Viscosity $\eta_{75}$: 4,483 mPa.s.

EXAMPLE 2

5 g of water were added to 32 g of an $\alpha,\omega$-diaminopolypropylene oxide of average molecular weight 400, and 17.6 g (0.3 mole) of propylene oxide were added under nitrogen (pressure of 1.5 bar) at 100° C. After 5 hours, 16 g of 45% strength aqueous potassium hydroxide solution were added and water was then distilled off at 100° C. in vacuo. 1,751.4 g (30.2 moles) of propylene oxide were then added in the course of 11.5 hours and 4,178 g (94.9 moles) of ethylene oxide were added in the course of 13.5 hours, in each case at 120° to 130° C. The reaction product was then neutralized with 8.55 g (0.14 mole) of 99.8% strength acetic acid. 5,500 g of a waxy polyether of melting point 53° to 54° C. were obtained.

OH number: 10.4.
Viscosity $\eta_{75}$: 2,699 mPa.s.

EXAMPLE 3

5 g of water were added to 62.2 g of an $\alpha,\omega$-diaminopolyether of average molecular weight 779, consisting of 22.4% of propylene glycol units and 77.6% of ethylene glycol units, and 17.6 g (0.30 mole) of propylene oxide were added under nitrogen (pressure of 1.5 bar) at 100° C. After 5 hours, 16 g of 45% strength aqueous potassium hydroxide solution were added and water was then distilled off at 100° C. in vacuo. 1,750 g (30.2 moles) of propylene oxide were then added in the course of 14 hours and 4,200 g (95.5 moles) of ethylene oxide were added in the course of 14.5 hours, in each case at 120° to 130° C. The reaction product was then neutralized with 8.55 g (0.14 mole) of 99.8% strength acetic acid. 5,620 g of a waxy polyether of melting point 55° C. were obtained.

OH number: 9.9.
Viscosity $\eta_{75}$: 2,839 mPa.s.

EXAMPLE 4

2.0 g of water were added to 160.7 g of an $\alpha,\omega$-diamino-polypropylene oxide of average molecular weight, 2,000, and 17.7 g (0.30 mole) of propylene oxide were added at 100° C. under nitrogen (pressure of 1.5 mm Hg). After 5 hours, 16 g of 45% strength aqueous potassium hydroxide solution were added and water was then distilled off at 100° C. in vacuo. 1,150.2 g (19.8 moles) of propylene oxide were then added in the course of 18 hours and 4,671.4 g (106.2 moles) of ethylene oxide were added in the course of 15.5 hours, in each case at 120° to 130° C. The reaction product was then neutralized with 8.55 g (0.14 mole) of 99.9% strength acetic acid. 5,300 g of a waxy polyether of melting point 57°–58° C. were obtained.

OH number: 8.6.
Viscosity $\eta_{75}$: 4,224 mPa.s.

EXAMPLE 5

16 g of 45% strength aqueous potassium hydroxide solution were added to 160.7 g of an $\alpha,\omega$-diaminopolypropylene oxide of average molecular weight 2,000 and water was then distilled off at 100° C. in vacuo. 1,751.8 g (30.2 moles) of propylene oxide and then 4,087.5 g (92.9 moles) of ethylene oxide were added at 120° to 130° C. The entire reaction time was 42 hours. After addition of 52.2 g of 12% strength aqueous sulphuric acid (0.06 mole), 5,400 g of a waxy polyether of melting point 54° C. were obtained.

OH number: 8.
Viscosity $\eta_{75}$: 3,656 mPa.s.

EXAMPLE 6

5 g of water were added to 321 g of an $\alpha,\omega$-diaminopolypropylene oxide of average molecular weight 3,412, and 17 g (0.29 mole) of propylene oxide were added under nitrogen (pressure of 1.5 bar) at 100° C. After 5 hours, 16 g of 45% strength aqueous potassium hydroxide solution were added and water was then distilled off at 100° C. in vacuo. 1,119 g (19.3 moles) of propylene oxide were then added in the course of 11 hours and 4,543 g (103.3 moles) of ethylene oxide were added in the course of 14 hours, in each case at 120° to 130° C. The reaction product was then neutralized with 8.55 g (0.14 mole) of 99.8% strength acetic acid. 5,650 g of a waxy polyether of melting point 55°–56° C. were obtained.

OH number: 11.3.
Viscosity $\eta_{75}$: 2,840 mPa.s.

EXAMPLE 7

5 g of water were added to 280 g of a polypropylene oxide of average molecular weight 5,250, started from trimethylolpropane and with three terminal primary amino groups, and 17.6 g (0.3 mole) of propylene oxide were added under nitrogen (pressure of 1.5 bar) at 100° C. After 5 hours, 16 g of 45% strength aqueous potassium hydroxide solution were added and water was then distilled off at 100° C. in vacuo. 1,327.6 g (22.9 moles) of propylene oxide were then added in the course of 12 hours and 4,628 g (105.2 moles) of ethylene oxide were added in the course of 16 hours, in each case at 120° to 130° C. The reaction product was then neutralized with 8.55 g (0.14 mole) of 99.8% strength acetic acid. 5,700 g of a waxy polyether of melting point 51°–55° C. were obtained.

OH number: 8.3.
Viscosity $\eta_{75}$: 4,610 mPa.s.

EXAMPLE 8

5 g of water were added to 29.3 g of a polypropylene oxide of average molecular weight 440, started from trimethylolpropane and with three terminal primary amino groups, and 17.6 g (0.3 mole) of propylene oxide were added under nitrogen (pressure of 1.5 bar) at 100° C. After 5 hours, 16 g of 45% strength aqueous potassium hydroxide solution were added and water was then distilled off at 100° C. in vacuo. 1,732.3 g (29.9 moles) of propylene oxide were then added in the course of 12 hours and 4,211 g (95.7 moles) of ethylene oxide were added in the course of 13 hours, in each case at 120° to 130° C. The reaction product was then neutralized with 8.55 g (0.14 mole) of 99.8% strength acetic acid. 5,500 g of a waxy polyether of melting point 52°–55° C. were obtained.

OH number: 10.7.
Viscosity $\eta_{75}$: 2,842 mPa.s.

EXAMPLE 9

5 g of water were added to 256 g of a polypropylene oxide of average molecular weight 6,400 started from pentaerythritol and with four terminal primary amino groups, and 17.6 g (0.3 mole) of propylene oxide were added under nitrogen (pressure of 1.5 bar) at 100° C. After 5 hours, 16 g of 45% strength aqueous potassium hydroxide solution were added and water was then distilled off at 100° C. in vacuo. 1,170.4 g (20.2 moles) of propylene oxide were then added in the course of 11.5 hours and 4,511.5 g (102.5 moles) of ethylene oxide were added in the course of 14.5 hours, in each case of 120° to 130° C. The reaction product was then neutralized with 8.55 g (0.14 mole) of 99.8% strength acetic acid. 5,400 g of a waxy polyether of melting point 56°–59° C. were obtained.

OH number: 9.4.
Viscosity $\eta_{75}$: 3,416 mPa.s.

EXAMPLE 10

600 g of the product obtained according to Example 2 were dried at 100° C. in vacuo. A mixture of 6 g of urea and 10 g of amidosulphonic acid was then added at 75° C. and the mixture was heated at 90° C. for 1 hour and at 100° to 150° C. for 6 hours, while stirring thoroughly. The batch was then brought to pH 7 to 8 (measured in 10% strength aqueous solution) with 0.5 cm³ of 25% strength aqueous ammonia solution. A 60% strength aqueous solution could be prepared from this product without a solvent.

B.

Preparation examples for coal/water slurries

EXAMPLE 11

The following mineral coal was used:

| Chemical analysis: | |
|---|---|
| Carbon | 77.1% by weight |
| Hydrogen | 4.3% by weight |
| Nitrogen | 1.3% by weight |
| Oxygen | 3.8% by weight |
| Sulphur | 0.9% by weight |
| Total moisture | 9.8% by weight |
| Sieve analysis: | |
| (sieve residue) 15 ultrasound | |
| 192 μm | 0.0% by weight |
| 96 μm | 8.2% by weight |
| 64 μm | 19.8% by weight |
| 48 μm | 27.0% by weight |
| 24 μm | 51.7% by weight |
| 16 μm | 63.2% by weight |
| 8 μm | 80.0% by weight |
| 2 μm | 94.3% by weight |

In each case 2.5 g of the products prepared according to Examples 1 to 10 (=additive) were dissolved in 92.9 g portions of water. In each case 404.6 g of the abovementioned coal (that is to say 365 g of dry coal) were added, with stirring. A 73% strength aqueous coal slurry was formed, and was subsequently stirred at 1,500 revolutions per minute for 2 hours. The viscosity was determined with a Haake viscometer RV 100 (measurement body MV II PSt) at 23° C. with a shear rate of D=100 s⁻¹. The results can be seen from Table 1.

TABLE 1

| Additive obtained according to Example | Viscosity (mPa · s) at 100 s⁻¹ |
|---|---|
| 1 | 800 |
| 2 | 750 |
| 3 | 800 |
| 4 | 900 |
| 6 | 850 |
| 7 | 850 |
| 8 | 800 |
| 9 | 750 |
| 10 | 750 |

EXAMPLE 12

The following mineral coal was used:

| Chemical analysis: | |
|---|---|
| Carbon | 68.0% by weight |
| Hydrogen | 5.0% by weight |
| Nitrogen | 2.0% by weight |
| Oxygen | 12.4% by weight |
| Sulphur | 0.2% by weight |
| Total moisture | 1.6% by weight |
| Sieve analysis: | |
| (sieve residue) 15 ultrasound | |
| 192 μm | 0.0% by weight |
| 96 μm | 11.3% by weight |
| 48 μm | 34.9% by weight |
| 24 μm | 61.6% by weight |
| 16 μm | 71.9% by weight |

| | |
|---|---|
| 8 μm | 85.2% by weight |
| 2 μm | 95.5% by weight |

64% strength coal/water slurries were prepared as described in Example 11 from this coal. The results of the viscosity measurements can be seen from Table 2.

TABLE 2

| Additive obtained according to Example | Viscosity (mPa · s) at 100 s$^{-1}$ |
|---|---|
| 1 | 650 |
| 2 | 650 |
| 3 | 750 |
| 4 | 750 |
| 5 | 850 |
| 6 | 800 |
| 7 | 800 |
| 8 | 750 |
| 10 | 650 |

EXAMPLE 13

The following mineral coal was used:

| Chemical analysis: | |
|---|---|
| Carbon | 82.9% by weight |
| Hydrogen | 5.7% by weight |
| Nitrogen | 1.7% by weight |
| Oxygen | 6.4% by weight |
| Sulphur | 1.0% by weight |
| Total moisture | 3.1% by weight |
| Sieve analysis: (sieve residue) 15 ultrasound | |
| 192 μm | 0.0% by weight |
| 128 μm | 8.5% by weight |
| 96 μm | 17.6% by weight |
| 64 μm | 35.0% by weight |
| 48 μm | 46.0% by weight |
| 24 μm | 69.8% by weight |
| 16 μm | 78.8% by weight |
| 8 μm | 87.0% by weight |
| 2 μm | 96.5% by weight |

68% strength coal/water slurries were prepared as described in Example 11 from this coal. The results of the viscosity measurements can be seen from Table 3.

TABLE 3

| Additive obtained according to Example | Viscosity (mPa · s) at 100 s$^{-1}$ |
|---|---|
| 1 | 650 |
| 2 | 600 |
| 3 | 700 |
| 6 | 700 |
| 7 | 700 |
| 8 | 650 |
| 10 | 600 |

EXAMPLE 14

The procedure was as described in Example 11, but only the additive obtained according to Example 2 was employed and the solids content of the slurry was varied. The results of the viscosity measurements can be seen from Table 4.

TABLE 4

| Solids content (% by weight, based on the slurry) | Viscosity (mPa · s) at 100 s$^{-1}$ |
|---|---|
| 68 | 200 |
| 70 | 350 |
| 73 | 750 |
| 75 | 1,200 |

EXAMPLE 15

The procedure was as described in Example 12, but only the additive obtained according to Example 2 was employed and its content was varied. The results of the viscosity measurements can be seen from Table 5.

TABLE 5

| % by weight of additive, based on the slurry | Solids content (% by weight, based on the slurry) | Viscosity (mPa · s) at 100 s$^{-1}$ |
|---|---|---|
| 0.3 | 64 | 850 |
| 0.4 | 64 | 650 |
| 0.5 | 64 | 650 |
| 0.7 | 64 | 700 |
| 1.0 | 64 | 800 |

EXAMPLE 16

The procedure was as described in Example 11, but some of the water was replaced by methanol and the solids content of the slurry was varied. The results of the viscosity measurements can be seen from Table 6.

TABLE 6

| Additive obtained according to Example | % by weight of coal based on the slurry | Weight ratio of water/methanol | Viscosity (mPa · s) at 100 s$^{-1}$ |
|---|---|---|---|
| 2 | 71 | 7:3 | 750 |
| 4 | 71 | 7:3 | 1,000 |
| 2 | 73 | 7:3 | 1,300 |
| 2 | 73 | 1:1 | 2,500 |
| 4 | 73 | 7:3 | 1,500 |

EXAMPLE 17

(for comparison)

The procedure was as described in Example 11, but in each case 0.5% by weight, based on the slurry, of an additive according to the prior art was employed and comparison tests were carried out with 3 different grades of coal. The results of the viscosity measurements can be seen from Table 7.

From Table 7, No. 1, 4 and 7, a comparison with Table 1 shows that the additives according to the invention give viscosities of 750 to 900 mPa.s for 73% strength coal/water slurries, whilst according to the prior art, viscosities of 1,000 to 1,100 mPa.s are reached.

Corresponding statements apply to 64% strength coal/water slurries, were viscosities of 650 to 850 mPa.s are obtained according to the invention (see Table 2) and viscosities of 1,050 to 1,350 mPa.s (see Table 7, No. 2, 5 and 8) are obtained according to the prior art.

The situation is similar with 68% strength coal water slurries, with which viscosities of 600 to 700 mPa.s are obtained with additives according to the invention (see Table 3), and viscosities of 1,000 to 1,200 mPa.s (see Table 7, No. 3, 6 and 9) are obtained according to the prior art.

TABLE 7

| No. | Coal as in Example | Solids content (% by weight, based on the slurry) | Starter molecule for the additive | Average functionality | Viscosity (mPa · s) at 100 s$^{-1}$ |
|---|---|---|---|---|---|
| 1 | 11 | 73 | Stearyl alcohol | 1 | 1,100 |
| 2 | 12 | 64 | (according to U.S. Pat. No. | 1 | 1,200 |
| 3 | 13 | 68 | 4,302,212) | 1 | 1,000 |
| 4 | 11 | 73 | Pentaerythritol | 4 | 1,000 |
| 5 | 12 | 64 | (according to JP-OS | 4 | 1,350 |
| 6 | 13 | 68 | (Japanese Published Specification) 58/125789) | 4 | 1,050 |
| 7 | 11 | 73 | Ethylenediamine (110 | 4 | 1,100 |
| 8 | 12 | 64 | propylene oxide units/140 | 4 | 1,050 |
| 9 | 13 | 68 | ethylene oxide units according to U.S. Pat. No. 4,358,293) | 4 | 1,200 |

It will be appreciated that the instant specification and claims are set forth by way of illustration and not limitation, and that various modifications and changes may be made without departing from the spirit and scope of the present invention.

We claim:

1. An alkoxylated aminopolyether of the formula (I)

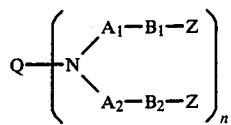

in which
Q denotes a polyalkylene oxide radical which has a valency corresponding to n, which has a structure derived from an aminopolyether by removal of the terminal amino groups and which has an average molecular weight of 82 to 30,000,
$A_1$ and $A_2$ denote identical or different mono- or polyalkylene oxide radicals of the type $(RO)_y$,
wherein
each radical R represents an alkylene radical with 2 to 40 C atoms and
y represents an integer from 1 to 200,
$B_1$ and $B_2$ denote identical or different mono- or polyalkylene oxide radicals of the type $(R'O)_z$,
wherein
at least 50% of the R' radicals represent a $-CH_2-CH_2-$ group,
the other R' radicals which may be present each represent an alkylene radical with 3 to 40 C atoms and
z represents an integer from 1 to 300,
Z denotes hydrogen,

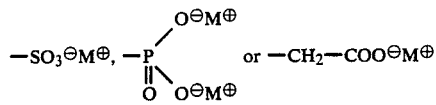

wherein
$M^\oplus$ represents one equivalent of a metal ion or represents $NH_4^\oplus$ and
n denotes an integer from 1 to 30.

2. An alkoxylated aminopolyether according to claim 1, wherein in formula (1), independently of one another,
Q denotes the radical of a polypropylene oxide, polyethylene/polypropylene oxide, polytetramethylene oxide or polytetramethylene oxide/polydecene oxide started from ethylene glycol, propylene glycol, trimethylolpropane, glycerol, pentaerythritol, ethylenediamine or hexamethylenediamine and in each case with an average molecular weight of 82 to 7,000,
$A_1$ and $A_2$ denote identical or different mono- or polyalkylene oxide radicals of the type $(RO)_y$,
wherein
each radical R represents an alkylene radical with 2 to 12 C atoms and
y represents an integer from 1 to 80,
$B_1$ and $B_2$ denote identical or different polyalkylene oxide radicals of the type $(R'O)_z$,
wherein
60 to 100% of the R' radicals represent a $-CH_2-CH_2-$ group,
the other R' radicals which may be present each represent an alkylene radical with 3 to 12 C atoms and
z represents an integer from 50 to 200,
Z denotes hydrogen,

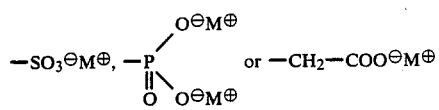

wherein
$M^\oplus$ represents one equivalent of a metal ion or represents $NH_4^\oplus$, which forms soluble sulphonium, phosphonium or carboxyl salts, and
n denotes an integer from 1 to 8.

3. An alkoxylated aminopolyether according to claim 1, wherein said alkoxylated amino polyether has a molecular weight of 10,000 to 150,000.

4. An alkoxylated aminoethyl according to claim 1, wherein $M^\oplus$ is an alkali metal ion or an alkaline earth metal ion or $NH_4^\oplus$.

5. A process for the preparation of an alkoxylated aminopolyether of the formula (I)

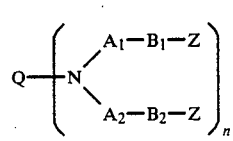

in which
Q denotes a polyalkylene oxide radical which has a valency corresponding to n, which has a structure derived from an aminopolyether by removal of the terminal amino groups, and which as an average molecular weight of 82 to 30,000, $A_1$ and $A_2$ denote identical or different mono- or polyalkylene oxide radicals of the type $(RO)_y$, wherein
each radical R represents an alkylene radical with 2 to 40 C atoms and
y represents an integer from 1 to 200, $B_1$ and $B_2$ denote identical or different mono- or poly-alkylene oxide radicals of the type $(R'O)_z$, wherein
at least 50% of the R' radicals represent a $-CH_2-CH_2-$ group,
the other R' radicals which may be present each represent an alkylene radical with 3 to 40 C atoms and
z represents an integer from 1 to 300, Z denotes hydrogen,

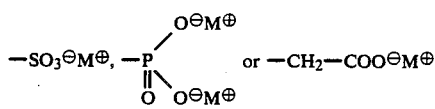

wherein
$M^\oplus$ represents one equivalent of a metal ion or represents $NH_4^\oplus$ and
n denotes an integer from 1 to 30, said process comprising (a) adding a $C_2$- to $C_{20}$-alkylene oxide onto an aminopolyalkylene ether such that in each case at least two alkylene oxide units react with an amino group, (b) reacting the product of step (a) with ethylene oxide or a mixture of $C_2$- to $C_{40}$-epoxides, and (c) conducting neutralization or hydrolysis.

6. A process according to claim 5, wherein the reaction of an amino-polyalkylene ether with a $C_2$- to $C_{12}$-alkylene oxide is carried out at 50° to 150° C. and in the presence of a base, as a catalyst, and the reaction with ethylene oxide or a mixture of $C_2$- to $C_{40}$-epoxides is then carried out such that 50 to 200 ethylene oxide units per chain are introduced one after the other.

7. A process according to claim 5, wherein said amino-polyalkylene ether is an amino-polyalkylene ether with amino end groups and has an average molecular weight of 82 to 30,000.

8. A process according to claim 5, which further comprises reacting the product of step (b) with carboxylic acid anhydrides, amidusulphonic acids and urea, acid chlorides of sulphur or of phosphorus or chloroacetic acid esters.

9. A process according to claim 6, wherein said base is selected from the group consisting of alkali metal hydroxides and alcoholates.

10. A process according to claim 5, wherein the molar ratio of $C_2$- to $C_{12}$-alkylene oxide to amino-polyalkylene ether is 4:1 to 1,600:1.

11. An alkoylated aminopolyether according to claim 1, wherein z is 50 to 200 and Z denotes $-SO_3^\ominus M^\oplus$ or $-CH_2-COO^\ominus M^\oplus$.

* * * * *